United States Patent [19]

Tanimoto et al.

[11] Patent Number: 5,240,544
[45] Date of Patent: Aug. 31, 1993

[54] ADHESIVE COMPOSITION

[75] Inventors: Yoshio Tanimoto, Sakura; Nobuyuki Yoshida, Ichihara; Mitsuji Tsuji, Ichihara; Eiichi Usuda, Ichihara; Kouji Satou, Chiba, all of Japan

[73] Assignee: Sumitomo Chemical Company, Limited, Osaka, Japan

[21] Appl. No.: 870,120

[22] Filed: Apr. 17, 1992

Related U.S. Application Data

[60] Continuation of Ser. No. 501,958, Mar. 29, 1990, abandoned, which is a division of Ser. No. 331,599, Mar. 31, 1989, abandoned.

[30] Foreign Application Priority Data

Apr. 5, 1988 [JP] Japan .................. 63-84345
Apr. 8, 1988 [JP] Japan .................. 63-87552

[51] Int. Cl.$^5$ .................. C09J 151/04; C09J 15/06; C08L 51/04; C08L 51/06
[52] U.S. Cl. .................. 156/331.6; 525/285; 525/301; 525/379; 525/382; 524/531
[58] Field of Search ............... 525/285, 301, 379, 382; 524/531; 156/331.6, 327

[56] References Cited

U.S. PATENT DOCUMENTS

| 2,977,334 | 3/1961 | Zopf, Jr. et al. ............ 524/531 |
| 3,427,183 | 2/1969 | Portolani et al. . |
| 3,673,022 | 5/1969 | Iwami et al. ............ 156/327 |
| 4,009,228 | 2/1977 | Tazuma et al. . |
| 4,134,927 | 1/1979 | Tomoshige et al. ............ 525/263 |
| 4,230,830 | 10/1980 | Tanny et al. ............ 156/327 |
| 4,299,754 | 11/1981 | Shiomi et al. ............ 524/531 |
| 4,350,740 | 9/1982 | Coran et al. ............ 156/331.6 |
| 4,822,688 | 4/1989 | Nogues ............ 525/285 |
| 4,948,850 | 8/1990 | Hasenbein et al. ............ 525/379 |
| 4,983,685 | 1/1991 | Aoshima et al. ............ 525/379 |
| 5,037,891 | 8/1991 | Takao et al. ............ 525/285 |
| 5,093,429 | 3/1992 | Moteki et al. ............ 525/379 |

FOREIGN PATENT DOCUMENTS

| 0002286 | 6/1979 | European Pat. Off. . |
| 0011474 | 5/1980 | European Pat. Off. . |
| 0188926 | 7/1986 | European Pat. Off. . |
| 0193126 | 9/1986 | European Pat. Off. ............ 525/285 |
| 0265371 | 4/1988 | European Pat. Off. . |
| 1341727 | 9/1963 | France . |
| 52-045689 | 4/1977 | Japan . |
| 52-049289 | 4/1977 | Japan . |
| 58-445 | 1/1983 | Japan . |
| 0034809 | 3/1983 | Japan ............ 525/285 |
| 0118809 | 7/1983 | Japan ............ 525/285 |
| 58-53005 | 11/1983 | Japan . |
| 0030841 | 2/1984 | Japan ............ 525/285 |
| 0059763 | 4/1984 | Japan ............ 525/285 |
| 62-112614 | 5/1987 | Japan . |
| 62-212614 | 5/1987 | Japan . |
| 63-95236 | 4/1988 | Japan . |
| 0052067 | 10/1966 | Poland ............ 525/285 |
| 52067 | 10/1966 | Poland ............ 525/285 |
| 767068 | 1/1957 | United Kingdom . |

OTHER PUBLICATIONS

Translation of Japan 62-112614 (May 1987), of record.

Primary Examiner—Vasu S. Jagannathan
Attorney, Agent, or Firm—Stevens, Davis, Miller & Mosher

[57] ABSTRACT

An adhesive composition comprising a modified, ethylene/α-olefin copolymer rubber or a modified, ethylene/α-olefin/non-conjugated diene copolymer rubber containing 0.1-10% by weight of at least one member selected from the group consisting of an acid anhydride and a dicarboxylic acid, and, if necessary, as an amine compound, (i) 0.2-2 moles of a dialkylamine per mole of the acid anhydride in said modified copolymer rubber when said modified copolymer rubber contains no dicarboxylic acid;

(ii) 0.2-2 moles of a polyamine compound per mole of the total amount of the acid anhydride and the dicarboxylic acid in said modified copolymer rubber; or (iii) 0.2-2 moles of a dialkylamine per mole of the acid anhydride in said modified copolymer rubber and 0.2-2 moles of a polyamine compound per mole of the acid anhydride in said modified copolymer rubber when said modified copolymer rubber contains no dicarboxylic acid. The above adhesive composition exhibits good adhesion for rubber compositions, particularly low unsaturated, non-polar rubber compositions and fibers, and is excellent in storage stability.

26 Claims, No Drawings

ADHESIVE COMPOSITION

This application is a continuation of application Ser. No. 07/501,958, filed Mar. 29, 1990 now abandoned, which in turn is a division of prior application Ser. No. 07/331,599, filed Mar. 31, 1989 now abandoned.

The present invention relates to an adhesive composition suitable for adhering rubber compositions and fibers. More particularly, the present invention relates to an adhesive composition suitable for adhering rubber compositions each consisting of a low unsaturated, non-polar rubber such as an ethylene/α-olefin copolymer rubber, an isobutylene/isoprene copolymer rubber or the like.

As an adhesive for rubber compositions, etc., there has been widely used an adhesive composition consisting mainly of a polymer material containing a halogenated compound. However, the above adhesive composition does not exhibit sufficient adhesion for all the rubber compositions. Particularly, it does not exhibit sufficient adhesion for rubber compositions each consisting of the above-mentioned low unsaturated, non-polar rubber.

The present inventors have investigated an adhesive composition suitable for adhering rubber compositions, particularly rubber compositions each consisting of a low unsaturated, non-polar rubber.

An object of the present invention is to provide a novel adhesive composition consisting mainly of an ethylene/α-olefin copolymer or ethylene/α-olefin/non-conjugated diene copolymer rubber containing an acid anhydride and/or a dicarboxylic acid and which exhibits good adhesion for rubber compositions each consisting of a low unsaturated, non-polar rubber and fibers.

Other objects and advantages of the invention will become apparent from the following description.

According to the present invention, there is provided an adhesive composition comprising a modified, ethylene/α-olefin copolymer or modified, ethylene/α-olefin/non-conjugated diene copolymer rubber containing 0.1–10% by weight of an acid anhydride and/or a dicarboxylic acid (hereinafter referred to as the modified copolymer rubber).

The present invention further provides an adhesive composition comprising said adhesive composition and an organic solvent.

In the present specification, the ethylene/α-olefin copolymer rubber and the ethylene/α-olefin/non-conjugated diene copolymer rubber are hereinafter referred to as the copolymer rubbers, collectively.

The α-olefins may preferably be those having 3–10 carbon atoms. Specifically, the α-olefin includes propylene, 1-butene, 1-pentene, 1-hexene and the like.

The non-conjugated diene includes dicyclopentadiene, ethylidenenorbornene, 1,4-hexadiene, and the like.

The acid anhydride includes maleic anhydride, citraconic anhydride, nadic anhydride and the like.

The dicarboxylic acid includes maleic acid, fumaric acid, itaconic acid, citraconic acid, nadic acid and the like.

The amount of the acid anhydride and/or the dicarboxylic acid in the modified copolymer rubber is in a range of 0.1–10% by weight. When the amount is smaller than 0.1% by weight, the adhesive strength is lower and when the amount is larger than 10% by weight, a great enhancement of the adhesive strength is not expected. The amount is preferably in a range of 0.2–8% by weight, more preferably, in a range of 0.5–5% by weight.

The modified copolymer rubber in the present invention may be produced by a conventional reaction. For example, the modified copolymer rubber can be produced according to the methods described in Japanese Patent Application Kokoku No. 58-53005 and Japanese Patent Application Kokoku No. 58-445, etc.

The modified copolymer rubber containing a dicarboxylic acid alone can be easily produced by hydrolyzing the modified copolymer rubber containing an acid anhydride, too.

Also, the modified copolymer rubber containing both the acid anhydride and the dicarboxylic acid can be produced by controlling the degree of hydrolysis.

Further, a modified copolymer rubber comprising an alkenyl aromatic monomer such as styrene, methylstyrene or the like and an acid anhydride and/or a dicarboxylic acid can be preferably used, which are produced according to the method described in Japanese Patent Application Kokai No. 62-112614.

In order to improve storage stability to maintain high adhesive strength, the modified copolymer rubber containing an acid anhydride and no dicarboxylic acid may contain a dialkylamine.

The dialkylamine used in the present invention includes dimethylamine, diethylamine, dipropylamine, diisopropylamine, dibutylamine, diisobutylamine, di-t-butylamine, di-sec-butylamine, diamylamine, dihexylamine, dioctylamine and the like. Diethylamine, dipropylamine and dibutylamine are preferable.

The amount of the dialkylamine used is in a range of 0.2–2 moles, preferably 0.5–1.5 moles and more preferably 0.8–1.2 moles per mole of the acid anhydride in the modified copolymer rubber which contains no dicarboxylic acid. When the amount is smaller than 0.2 mole, the enhancement of the storage stability is smaller and when the amount is larger than 2 moles, the adhesive strength is lower.

The reaction of the dialkylamine with the modified copolymer rubber which contains no dicarboxylic acid can be conducted merely by adding the dialkylamine to a solution of the modified copolymer rubber which contains no dicarboxylic acid in an organic solvent, for example, an aromatic hydrocarbon solvent such as toluene, xylene, ethylbenzene or the like; or an aliphatic hydrocarbon solvent such as hexane, heptane, octane, decane or the like. Preferably, the above reaction is conducted with heating and stirring.

In the present invention, a polyamine compound may be added to the modified copolymer rubber in order to improve adhesion ability.

The polyamine compound used in the present invention includes aliphatic polyamine compounds and aromatic polyamine compounds. Specifically, the aliphatic polyamine compounds include ethylenediamine, triethylenediamine, tetramethylenediamine, pentamethylenediamine, hexamethylenediamine, 1,7-diaminoheptane, 1,8-diaminooctane, 1,9-diaminononane, 1,10-diaminodecane, trimethylhexamethylenediamine, diethylenetriamine, dipropylenetriamine, triethylenetriamine, tetraethylenepentamine, dimethylaminopropylamine, diethylaminopropylamine, hexamethylenediamine carbamate, ethylenediamine carbamate, N,N'-dicinnamylidene-1,6-hexanediamine and the like; and the aromatic polyamine compounds include o-phenylenediamine, m-phenylenediamine, p-phenylenediamine and the like.

Hexamethylenediamine and hexamethylenediamine carbamate are preferred.

The amount of the polyamine compound added is in a range of 0.2-2 moles per mole of the total amount of the acid anhydride and the dicarboxylic acid in the modified copolymer rubber. Preferably, the amount is in a range of 0.25-1.5 moles, more preferably in a range of 0.3-1 mole. When the amount is smaller than 0.2 mole, the enhancement of the adhesive strength is smaller and when the amount is larger than 2 moles, the adhesive strength cannot be expected to be enhanced proportionally to the amount.

In the present invention, the organic solvents may generally be aliphatic solvents, aromatic solvents, halogen-containing solvents and the like. Specifically, the organic solvent includes pentane, hexane, cyclohexane, benzene, toluene, xylene, ethylbenzene, ethyltoluene, cumene, diethylbenzene, chloroform, tetrachloromethane and the like. The concentration of the adhesive composition in the solution is in a range of 5-50% by weight and is selected depending upon the molecular weight of the modified copolymer rubber contained in the adhesive composition and a process for coating the adhesive composition.

The adhesive composition of the present invention may optionally comprise reinforcing agents, fillers, softening agents, tackifiers and the like which are known in the adhesive industry and the rubber industry.

The adhesive composition of the present invention exhibits good adhesion for rubber compositions, particularly rubber compositions each containing a low unsaturated, non-polar rubber such as ethylene/α-olefin copolymer rubbers, ethylene/propylene/diene terpolymer rubbers (EPDM), isobutylene/isoprene rubber or the like. Specifically, for these rubbers, the adhesive composition is excellent in vulcanization adhesion between an unvulcanized rubber composition and a vulcanized one, adhesion of two vulcanized rubber compositions to each other, vulcanization adhesion between an unvulcanized rubber composition and a natural fiber or a synthetic fiber, adhesion between a vulcanized rubber composition and a natural fiber or a synthetic fiber, and the like.

Also, the adhesive composition of the present invention can be applied to the adhesion of two natural fibers to each other, two synthetic fibers to each other and between a natural fiber and a synthetic fiber.

The present invention is explained more specifically below referring to Examples and Comparative Examples.

EXAMPLES 1-7 and COMPARATIVE EXAMPLES 1-4

The compositions of adhesives used in the Examples and Comparative Examples are shown in Table 1.

To a maleic anhydride-containing ethylene/propylene or a ethylene/propylene/non-conjugated diene copolymer rubber was optionally added an additive with a roll and then the required amount of an organic solvent as shown in Table 1 was added to attain the solids concentration as shown in Table 1. The resulting mixture was heated at 50° C. for 8 hours to form a solution. The solutions obtained are hereinafter referred to as adhesive compositions A-C.

Adhesive composition D was obtained by allowing the maleic anhydride-containing modified copolymer rubber to stand at a temperature of 60° C. and a humidity of 80% for 1 hour in a thermo-hygrostat and thereafter dissolving the modified copolymer rubber in the organic solvent under the above conditions.

Adhesive composition E for comparison was obtained by dissolving an ethylene/α-olefin copolymer rubber in toluene in the same manner as above.

The compositions of rubber adherends are shown in Table 2. Compounding agents A were mixed in a BR-type Banbury mixer, and thereto were added compounding agents B using a 8-in roll. The obtained unvulcanized rubber composition was subjected to press vulcanization under the vulcanizing conditions shown in Table 2 to obtain a vulcanized sheet having a size of 150 mm × 150 mm × 2 mm. From the sheet, a sample strip having a size of 20 mm × 150 mm was made using a die cutter.

As a textile adherend, a sample strip having a size of 40 mm × 200 mm was cut from a textile.

One of the adhesive compositions A-E shown in Table 1 was coated uniformly on the sample strip of vulcanized rubber adherend using a glass bar. In adhesion of two vulcanized rubbers to each other, two sample strips were coated with an adhesive composition and, 30 minutes thereafter, the coated surfaces of the two sample strips were placed one on the other.

In adhesion of a vulcanized rubber adherend to a textile adherend, two sample strips were coated with an adhesive composition, and immediately thereafter, the coated surfaces were placed one on the other.

And then, every contacted sample strips were intimately pressed by having a handroller of 2 kg in weight pass over and return three times thereon and the strips were then cured under the conditions shown in Table 3.

In adhesion of a vulcanized rubber adherend to a textile adherend, after curing, the excess portion of the textile adherend was trimmed with scissors to leave it the same size as that of the sample strip of the vulcanized rubber adherend.

The adhesive strength of the adhered product was measured by a 180° peeling test at a peeling speed of 50 mm/min according to JIS K 6301.

The results obtained are shown together in Table 3.

EXAMPLES 8-12 and COMPARATIVE EXAMPLES 5-7

Sheets of 2 mm in thickness were made using a 8-in roll from the unvulcanized EPDM compositions A and B shown in Table 2. These sheets were cut in a size of 150 × 150 mm.

In adhesion of an unvulcanized rubber composition adherend to a vulcanized rubber composition adherend, the adhesive composition of Table 1 was applied using a glass bar at a surface of each sheet of the unvulcanized rubber composition adherend and the vulcanized rubber composition adherend each having a size of 150 × 150 mm. After the sheets were allowed to stand for 30 minutes, they were contacted with each other. The sheets were intimately pressed by having a handroller of 2 kg in weight pass over and return three times thereon. Thereafter the unvulcanized rubber composition adherend was vulcanized at 160° C. for 30 minutes in pressurized air of 3 kgf/cm$^2$.

In adhesion of an unvulcanized rubber composition adherend to a textile adherend, the adhesive composition was applied to the sheet of the unvulcanized rubber composition adherend. Immediately, the textile adherend having a size of 150 × 150 mm was placed thereon, pressed and vulcanized in the same manner as above. From the resulting sheet, a sample strip having 20 × 150 mm was made using a die cutter. The adhesive strength of the adhered product was measured by a 180° peeling test at a peeling speed of 50 mm/min according to JIS K 6301. The results obtained are shown together in Table 4.

EXAMPLES 13-15 and COMPARATIVE EXAMPLES 8-9

A textile sample as shown in Table 5 was cut in a size of 150×150 mm. One of the adhesive compositions A, C and E of Table 1 was applied uniformly to the textile sample using a glass bar, and immediately thereafter, the textile sample was placed on another textile sample to which no adhesion composition had been applied. And the resulting assembly was cured under the conditions shown in Table 5. From the assembly a sample strip having a size of 20×150 mm was made using a die cutter.

The adhesive strength was measured by a 180° peeling test at a peeling speed of 50 mm/min. The results obtained are shown together in Table 5.

EXAMPLES 16-21 and COMPARATIVE EXAMPLES 10-13

The compositions of adhesives used in the Examples and the Comparative Examples are shown in Table 6.

To a maleic anhydride-containing ethylene/propylene or ethylene/propylene/non-conjugated diene copolymer rubber reacted with a dialkylamine was optionally added an additive with a roll and then the required amount of an organic solvent as shown in Table 6 was added to attain the solids concentration as shown in Table 6. The resulting mixture was heated at 50° C. for 8 hours to form a solution. The solutions obtained are hereinafter referred to as adhesive compositions F-H.

Adhesive composition E for comparison was obtained by dissolving an ethylene/α-olefin copolymer rubber in toluene in the same manner as above.

The compositions of rubber adherends are shown in Table 2. Compounding agents A were mixed in a BR-type Banbury mixer, and thereto were added compounding agents B using a 8-in roll. The obtained unvulcanized rubber composition was subjected to press vulcanization under the vulcanizing conditions shown in Table 2 to obtain a vulcanized sheet having a size of 150 mm×150 mm×2 mm. From the sheet, a sample strip having a size of 20 mm×150 mm was made using a die cutter.

As a textile adherend, a sample strip having a size of 40 mm×200 mm was cut from a textile.

One of the adhesive compositions E-H shown in Table 6 was coated uniformly on the sample strip of vulcanized rubber adherend using a glass bar. In adhesion of two vulcanized rubbers to each other, two sample strips were coated with an adhesive composition and, 30 minutes thereafter, the coated surfaces of the two sample strips were placed one on the other.

In adhesion of a vulcanized rubber adherend to a textile adherend, two sample strips were coated with an adhesive composition, and immediately thereafter, the coated surfaces were placed one on the other.

And then, every contacted sample strips were intimately pressed by having a handroller of 2 kg in weight pass over and return three times thereon and the strips were then cured under the conditions shown in Table 7.

In adhesion of a vulcanized rubber adherend to a textile adherend, after curing, the excess portion of the textile adherend was trimmed with scissors to leave it the same size as that of the sample strip of the vulcanized rubber adherend.

The adhesive strength of the adhered product was measured by a 180° peeling test at a peeling speed of 50 mm/min according to JIS K 6301.

The results obtained are shown together in Table 7.

EXAMPLES 22-25 and COMPARATIVE EXAMPLES 14-16

Sheets of 2 mm in thickness were made using a 8-in roll from the unvulcanized EPDM compositions A and B shown in Table 2. These sheets were cut in a size of 150×150 mm.

In adhesion of an unvulcanized rubber composition adherend to a vulcanized rubber composition adherend, the adhesive composition of Table 6 was applied using a glass bar at a surface of each sheet of the unvulcanized rubber composition adherend and the vulcanized rubber composition adherend each having a size of 150×150 mm. After the sheets were allowed to stand for 30 minutes, they were contacted with each other. The sheets were intimately pressed by having a handroller of 2 kg in weight pass over and return three times thereon. Thereafter the unvulcanized rubber composition adherend was vulcanized at 160° C. for 30 minutes in pressurized air of 3 kgf/cm².

In adhesion of an unvulcanized rubber composition adherend to a textile adherend, the adhesive composition was applied to the sheet of the unvulcanized rubber composition adherend. Immediately, the textile adherend having a size of 150×150 mm was placed thereon, pressed and vulcanized in the same manner as above. From the resulting sheet, a sample strip having 20×150 mm was made using a die cutter. The adhesive strength of the adhered product was measured by a 180° peeling test at a peeling speed of 50 mm/min according to JIS K 6301. The results obtained are shown together in Table 8.

EXAMPLES 26-28 and COMPARATIVE EXAMPLES 17-18

A textile sample as shown in Table 9 was cut in a size of 150×150 mm. One of the adhesive compositions A, C and E of Table 1 was applied uniformly to the textile sample using a glass bar, and immediately thereafter, the textile sample was placed on another textile sample to which no adhesion composition had been applied. And the resulting assembly was cured under the conditions shown in Table 9. From the assembly a sample strip having a size of 20×150 mm was made using a die cutter.

The adhesive strength was measured by a 180° peeling test at a peeling speed of 50 mm/min. The results obtained are shown together in Table 9.

EXAMPLES 29-32

An experiment was carried out to investigate the storage stability of an adhesive composition before and after the reaction with a dialkylamine. The compositions of the adhesive compositions used and the results obtained are shown in Table 10.

200 g of an adhesive composition was charged into a 500-ml Erlenmeyer flask with a ground stopper and allowed to stand at room temperature for 30 days. The storage stability was estimated based on whether or not precipitates and turbidity were caused and on the change of a solution viscosity as measured at 25° C.

It is clarified that the modified copolymer rubber containing an acid anhydride reacted with a dialkylamine has high adhesion strength and improved storage stability.

EXAMPLES 33-40 and COMPARATIVE EXAMPLES 19

The compositions of the modified copolymer rubber-containing compositions used are shown in Table 11.

An additive was optionally added to a maleic anhydride-containing modified copolymer rubber, and then a required amount of an organic solvent was added thereto so as to attain the solids concentration shown in Table 11. The resulting mixture was heated at 50° C. for 8 hours to form a solution, to obtain adhesive composition K, M or N. Also, adhesive composition L was obtained by allowing the maleic anhydride-containing modified copolymer rubber containing the additive to stand at a temperature of 60° C. and at a humidity of 80% for 1 hour in a thermo-hygrostat and then dissolving the modified copolymer rubber in the organic solvent under the above conditions.

Adhesive composition O for comparison was prepared by dissolving an α-olefin copolymer in toluene under the above conditions.

The compositions of rubber adherends used are shown in Table 2. Compounding agents A as shown in Table 2 were mixed in a BR-type Banbury mixer, and thereto, compounding agents B as shown in Table 2 were added to the resulting mixture using a 8-in roll. The obtained unvulcanized rubber composition was subjected to press vulcanization under the vulcanizing conditions shown in Table 2 to obtain a vulcanized sheet having a size of 150 mm × 150 mm × 2 mm. From the sheet, a sample strip having a size of 20 mm × 150 mm was made using a die cutter.

As a textile adherend, a sample strip having a size of 40 × 200 mm was cut from a textile.

In accordance with one of the compositions of the adhesive compositions shown in Table 12, a diamine compound which is the polyamine compound was added to one of the adhesive compositions of Table 11, and the resulting mixture was stirred to obtain a uniform mixture. The mixture was coated uniformly on the above sample strip of a vulcanized rubber adherend using a glass bar. In adhesion of two vulcanized rubber adherends to each other, two sample strips were coated with an adhesive composition and allowed to stand for 30 minutes, after which the coated surfaces of the sample strips were placed one on the other.

In adhesion of a vulcanized rubber adherend to a textile adherend, the adhesive composition was applied to the sheet of the vulcanized rubber composition sample strip. Immediately, the textile sample strip having a size of 150 × 150 mm was placed thereon. The contacted sample strips were intimately pressed by having a hand-roller of 2 kg in weight pass over and return three times thereon and the strips were then cured under the conditions shown in Table 12.

In adhesion of a vulcanized rubber adherend to a textile adherend, after curing, the excess portion of the textile adherend was trimmed with scissors to leave it the same size as that of the sample strip of the vulcanized rubber adherend.

The adhesive strength of the adhered product was measured by a 180° peeling test at a peeling speed of 50 mm/min according to JIS K 6301.

The results obtained are shown together in Table 12.

EXAMPLES 41-44

Sheets of 2 mm in thickness were made using a 8-in roll from the unvulcanized EPDM compositions A and B shown in Table 2. These sheets were cut in a size of 150 × 150 mm.

In adhesion of an unvulcanized rubber composition adherend to a vulcanized rubber composition adherend, the adhesive composition of Table 13 was applied using a glass bar at a surface of each sheet of the unvulcanized rubber composition adherend and the vulcanized rubber composition adherend each having a size of 150 × 150 mm. After the sheets were allowed to stand for 30 minutes, they were contacted with each other. The sheets were intimately pressed by having a hand-roller of 2 kg in weight pass over and return three times thereon. Thereafter the unvulcanized rubber composition adherend was vulcanized at 160° C. for 30 minutes in pressurized air of 3 kgf/cm².

In adhesion of an unvulcanized rubber composition adherend to a textile adherend, the adhesive composition was applied to the sheet of the unvulcanized rubber composition adherend. Immediately, the textile adherend having a size of 150 × 150 mm was placed thereon, pressed and vulcanized in the same manner as above.

From the resulting sheet, a sample strip having 20 × 150 mm was made using a die cutter. The adhesive strength was measured by a 180° peeling test at a peeling speed of 50 mm/min according to JIS K 6301. The results obtained are shown together in Table 13.

EXAMPLES 45-48 and COMPARATIVE EXAMPLE 20

A textile was cut in a size of 150 × 150 mm. The textile was coated uniformly with the final adhesive composition of Table 14 with a glass bar, and immediately thereafter placed on a textile having a size of 150 × 150 mm which had not been coated with the adhesive composition. The resulting assembly was cured under the conditions shown in Table 14. A sample strip having a size of 20 × 150 mm was made therefrom with a die cutter. The adhesive strength was measured by a 180° peeling test at a peeling speed of 50 mm/min. The results obtained are shown in Table 14.

It is clarified by these examples that the adding of a polyamine compound increases the adhesion strength.

TABLE 1

| Adhesive composition | The modified copolymer rubber | | | | | | |
|---|---|---|---|---|---|---|---|
| | Intrinsic viscosity*[1] | Amount of propylene (% by weight) | Acid anhydride and/or dicarboxylic acid and the amount thereof (% by weight) | Non-conjugated diene and iodine number | Additive and amount (phr) | Organic solvent | Solids concentration (% by weight) |
| A | 1.4 | 22 | Maleic anhydride 1.3 | None | None | Toluene | 13 |
| B | 1.4 | 22 | Maleic anhydride 1.0 | None | FEF black 20 | Toluene | 10 |

TABLE 1-continued

| | | | The modified copolymer rubber | | | | |
|---|---|---|---|---|---|---|---|
| Adhesive composition | Intrinsic viscosity[*1] | Amount of propylene (% by weight) | Acid anhydride and/or dicarboxylic acid and the amount thereof (% by weight) | Non-conjugated diene and iodine number | Additive and amount (phr) | Organic solvent | Solids concentration (% by weight) |
| C | 1.1 | 40 | Maleic anhydride 4.7 | None | None | Toluene | 11 |
| D | 1.6 | 27 | Maleic anhydride 0.9 | Ethylideneorbornene | None | Xylene | 8 |
| | | | Maleic acid 0.3 | 5 | | | |
| E | 1.4 | 22 | None | None | None | Toluene | 13 |

Note: [*1] The intrinsic viscosity was measured at 30° C. in toluene.

TABLE 2

| Compounding agents | EPDM composition A (phr) | EPDM composition B (phr) | IIR composition (phr) |
|---|---|---|---|
| A | | | |
| EPDM I[*1] | 100 | — | — |
| EPDM II[*2] | — | 100 | — |
| IIR[*3] | — | — | 100 |
| FEF black | 150 | 120 | 90 |
| Nipsil VN3[*4] | — | 30 | — |
| Paraffin-type process oil | 100 | 100 | 30 |
| zinc oxide | 5 | 5 | 5 |
| Stearic acid | 1 | 1 | 1 |
| diethylene glycol | — | 1 | — |
| B | | | |
| ZnBDC[*5] | 2 | 2 | — |
| TMTD[*6] | 0.5 | 0.5 | 1.5 |
| DPTT[*7] | 0.5 | 0.5 | — |
| MBT[*8] | 1 | 1 | 1 |
| Sulfur | 1.5 | 1.5 | 1.3 |
| Vulcanization conditions | 170° C. × 10 min | 170° C. × 10 min | 160° C. × 10 min |

Note:
[*1] EPDM I: ethylene/propylene/ethylidenenorbornene terpolymer [ethylene/propylene ratio: 70/30; the ethylidenenorbornene content: 5% by weight; Mooney viscosity ($ML_{1-4}$ 121° C.): 65]
[*2] EPDM II: ethylene/propylene/ethylidenenorbornene [ethylene/propylene ratio: 64/45; the ethylidenenorbornene content: 10% by weight; Mooney viscosity ($ML_{1-4}$ 100° C.): 75]
[*3] IIR: isobutylene/isoprene rubber [unsaturation degree: 1.5%; Mooney viscosity ($ML_{1-4}$ 127° C.): 55]
[*4] Hydrous silica made by Nippon Silica.
[*5] Zinc di-n-butyldithiocarbamate
[*6] Tetramethylthiuram disulfide
[*7] Dipentamethylenethiuram tetrasulfide
[*8] 2-Mercaptobenzothiazole

TABLE 3

| | Adhesive composition | Adherends | Curing conditions | Adhesive strength (kgf/20 mm) |
|---|---|---|---|---|
| Example | | | | |
| 1 | A | Vulcanized EPDM composition A-vulcanized EPDM composition A | Allowed to stand at room temperature for 6 days | 4.2 |
| 2 | B | Vulcanized EPDM composition A-vulcanized EPDM composition A | Heated at 80° C. for 40 min and thereafter allowed to stand at room temperature for 6 days | 4.8 |
| 3 | C | Vulcanized EPDM composition B-vulcanized EPDM composition B | Heated at 80° C. for 40 min and thereafter allowed to stand at room temperature for 6 days | 5.2 |
| 4 | D | Vulcanized EPDM composition B-vulcanized EPDM composition B | Allowed to stand at room temperature for 6 days | 3.5 |
| 5 | A | Vulcanized EPDM composition B-nylon plain cloth of 100 denier | Heated at 120° C. for 40 min and thereafter allowed to stand at room temperature for 6 days | 1.8 |
| 6 | A | Vulcanized EPDM composition B-polyester plain cloth of 200 denier | Heated at 120° C. for 40 min and thereafter allowed to stand at room temperature for 6 days | 1.9 |
| 7 | A | Vulcanized IIR composition | Allowed to stand at | 2.7 |

TABLE 3-continued

| | Adhesive composition | Adherends | Curing conditions | Adhesive strength (kgf/20 mm) |
|---|---|---|---|---|
| | | C-vulcanized IIR composition C | room temperature for 6 days | |
| Comparative Example | | | | |
| 1 | E | Vulcanized EPDM composition B-vulcanized EPDM composition B | Heated at 80° C. for 40 min and thereafter allowed to stand at room temperature for 6 days | 0.9 |
| 2 | E | Vulcanized EPDM composition B-nylon plain cloth of 100 denier | Heated at 120° C. for 40 min and thereafter allowed to stand at room temperature for 6 days | 0.5 |
| 3 | Slock *1 8501 | Vulcanized EPDM composition B-vulcanized EPDM composition B | Heated at 80° C. for 40 min and thereafter allowed to stand at room temperature for 6 days | 1.2 |
| 4 | Slock *1 8501 | Vulcanized EPDM composition B-polyester plain cloth of 200 denier | Heated at 120° C. for 40 min and thereafter allowed to stand at room temperature for 6 days | 0.4 |

Note: *1 A CR-type adhesive made by Sakai Chemical CO., LTD. for vulcanized EPDM compositions.

TABLE 4

| | Adhesive composition | Adherends | Adhesive strength (kgf/20 mm) |
|---|---|---|---|
| Example | | | |
| 8 | A | Unvulcanized EPDM composition A-vulcanized EPDM composition A | 5.5 |
| 9 | B | Unvulcanized EPDM composition B-vulcanized EPDM composition B | 6.0 |
| 10 | D | Unvulcanized EPDM composition B-vulcanized EPDM composition B | 5.7 |
| 11 | A | Unvulcanized EPDM composition A-nylon plain cloth of 100 denier | 3.5 |
| 12 | A | Unvulcanized EPDM composition A-polyester plain cloth of 200 denier | 3.2 |
| Comparative Example | | | |
| 5 | E | Unvulcanized EPDM composition A-vulcanized EPDM composition | 1.5 |
| 6 | E | Unvulcanized EPDM composition A-nylon plain cloth of 100 denier | 0.9 |
| 7 | Slock 8501 | Unvulcanized EPDM composition A-polyester plain cloth of 200 denier | 0.5 |

TABLE 3

| | Adhesive composition | Adherends | Curing conditions | Adhesive strength (kgf/20 mm) |
|---|---|---|---|---|
| Example | | | | |
| 13 | A | Nylon plain cloth of 100 denier-nylon plain cloth of 100 denier | Heated at 150° C. for 40 min and thereafter allowed to stand at room temperature for 6 days | 2.1 |
| 14 | C | Polyester plain cloth of 200 denier-polyester plain cloth of 200 denier | Heated at 120° C. for 40 min and thereafter allowed to stand at room temperature for 6 days | 1.6 |
| 15 | A | Nylon plain cloth of 100 denier-polyester plain cloth of 200 denier | Heated at 150° C. for 40 min and thereafter allowed to stand at room temperature for 6 days | 1.2 |
| Comparative Example | | | | |
| 8 | E | Nylon plain cloth of 100 denier-nylon plain | Heated at 150° C. for 40 min and thereafter | 0.4 |

TABLE 3-continued

| | Adhesive composition | Adherends | Curing conditions | Adhesive strength (kgf/20 mm) |
|---|---|---|---|---|
| | | cloth of 100 denier | allowed to stand at room temperature for 6 days | |
| 9 | Slock 8501 | Nylon plain cloth of 100 denier-nylon plain cloth of 100 denier | Heated at 150° C. for 40 min and thereafter allowed to stand at room temperature for 6 days | 0.5 |

TABLE 6

| Adhesive composition | The modified copolymer rubber | | | Type of dialkylamine | | | |
|---|---|---|---|---|---|---|---|
| | Intrinsic viscosity*[1] | Amount of propylene (% by weight) | Non-conjugated diene and iodine number | Type of acid anhydride and the amount thereof (% by weight) | and the amount thereof (mole per mole of acid anhydride) | Additive and amount (phr) | Organic solvent | Solids concentration (% by weight) |
| F | 1.4 | 22 | None | Maleic anhydride 1.5 | Diethylamine 0.85 | None | Toluene | 12 |
| G | 1.8 | 27 | Ethylidenenor-bornene 5 | Maleic anhydride 1.0 | Dibutylamine 1.1 | FEF black 20 | Xylene | 10 |
| H | 1.0 | 45 | None | Maleic anhydride 4.2 | Dibutylamine 1.0 | None | Hexane | 9 |
| E | 1.4 | 22 | None | None | None | None | Toluene | 13 |

*[1] The intrinsic viscosity was measured at 80° C. in toluene.

TABLE 7

| | Adhesive composition | Adherends | Curing conditions | Adhesive strength (kgf/20 mm) |
|---|---|---|---|---|
| Example | | | | |
| 16 | F | Vulcanized EPDM composition A-vulcanized EPDM composition A | Allowed to stand at room temperature for 7 days | 5.3 |
| 17 | G | Vulcanized EPDM composition A-vulcanized EPDM composition A | Heated at 80° C. for 40 min and thereafter allowed to stand at room temperature for 7 days | 5.7 |
| 18 | H | Vulcanized EPDM composition B-vulcanized EPDM composition B | Heated at 80° C. for 40 min and thereafter allowed to stand at room temperature for 7 days | 4.8 |
| 19 | H | Vulcanized EPDM composition B-nylon plain cloth of 100 denier | Heated at 120° C. for 40 min and thereafter allowed to stand at room temperature for 7 days | 2.1 |
| 20 | H | Vulcanized EPDM composition B-polyester plain cloth of 200 denier | Heated at 120° C. for 40 min and thereafter allowed to stand at room temperature for 7 days | 2.4 |
| 21 | F | Vulcanized IIR composition C-vulcanized IIR composition C | Allowed to stand at room temperature for 7 days | 2.9 |
| Comparative Example | | | | |
| 10 | E | Vulcanized EPDM composition B-vulcanized EPDM composition B | Heated at 80° C. for 40 min and thereafter allowed to stand at room temperature for 7 days | 1.1 |
| 11 | E | Vulcanized EPDM composition B-nylon plain cloth of 100 denier | Heated at 120° C. for 40 min and thereafter allowed to stand at room temperature for 7 days | 0.6 |
| 12 | Slock 8501 | Vulcanized EPDM composition B-vulcanized EPDM composition B | Heated at 80° C. for 40 min and thereafter allowed to stand at room temperature for 7 days | 1.8 |

TABLE 7-continued

| Adhesive composition | Adherends | Curing conditions | Adhesive strength (kgf/20 mm) |
|---|---|---|---|
| 13 | Slock 8501 | Vulcanized EPDM composition B-polyester plain cloth of 200 denier | Heated at 120° C. for 40 min and thereafter allowed to stand at room temperature for 7 days | 0.4 |

TABLE 8

| | Adhesive composition | Adherends | Adhesive strength (kgf/20 mm) |
|---|---|---|---|
| Example | | | |
| 22 | F | Unvulcanized EPDM composition A-vulcanized EPDM composition A | 6.1 |
| 23 | G | Unvulcanized EPDM composition B-vulcanized EPDM composition B | 5.9 |
| 24 | F | Unvulcanized EPDM composition A-nylon plain cloth of 100 denier | 3.8 |
| 25 | F | Unvulcanized EPDM composition A-polyester plain cloth of 200 denier | 3.0 |
| Comparative Example | | | |
| 14 | E | Unvulcanized EPDM composition A-vulcanized EPDM composition A | 1.8 |
| 15 | E | Unvulcanized EPDM composition A-nylon plain cloth of 100 denier | 0.8 |
| 16 | Slock 8501 | Unvulcanized EPDM composition A-polyester plain cloth of 200 denier | 0.5 |

TABLE 9

| | Adhesive composition | Adherends | Curing conditions | Adhesive strength (kgf/20 mm) |
|---|---|---|---|---|
| Example | | | | |
| 26 | A | Nylon plain cloth of 100 denier - nylon plain cloth of 100 denier | Heated at 150° C. for 40 min and thereafter allowed to stand at room temperature for 7 days | 1.7 |
| 27 | C | Polyester plain cloth of 200 denier - polyester plain cloth of 200 denier | Heated at 120° C. for 40 min and thereafter allowed to stand at room temperature for 7 days | 2.8 |
| 28 | A | Nylon plain cloth of 100 denier - polyester plain cloth of 200 denier | Heated at 150° C. for 40 min and thereafter allowed to stand at room temperature for 7 days | 1.6 |
| Comparative Example | | | | |
| 17 | E | Nylon plain cloth of 100 denier - nylon plain cloth of 100 denier | Heated at 150° C. for 40 min and thereafter allowed to stand at room temperature for 7 days | 0.3 |
| 18 | Slock 8501 | Nylon plain cloth of 100 denier - nylon plain cloth of 100 denier | Heated at 150° C. for 40 min and thereafter allowed to stand at room temperature for 7 days | 0.5 |

TABLE 10

| Example | Adhesive composition | The modified copolymer rubber | | | Type of dialkylamine and the amount thereof (mole per mole of acid anhydride) | Organic solvent | Solids concentration (% by weight) | State after 30 days | |
|---|---|---|---|---|---|---|---|---|---|
| | | Intrinsic viscosity | Amount of propylene (% by weight) | Non-conjugated diene and iodine number | Acid anhydride and the amount thereof (% by weight) | | | | Change of appearance | Ratio of solution viscosity *1 |
| 29 | F | 1.4 | 22 | None | Maleic anhydride 1.5 | Diethylamine 0.85 | Toluene | 12 | No | 1.1 |
| 30 | H | 1.0 | 45 | None | Maleic anhydride 4.2 | Dibutylamine 1.0 | Hexane | 9 | No | 1.1 |

TABLE 10-continued

| | | The modified copolymer rubber | | | Type of dialkylamine | | Solids | State after 30 days | |
|---|---|---|---|---|---|---|---|---|---|
| Example | Adhesive composition | Intrinsic viscosity | Amount of propylene (% by weight) | Non-conjugated diene and iodine number | Acid anhydride and the amount thereof (% by weight) | and the amount thereof (mole per mole of acid anhydride) | Organic solvent | concentration (% by weight) | Change of appearance | Ratio of solution viscosity *1 |
| 31 | I | 1.4 | 22 | None | Maleic anhydride 1.5 | None | Toluene | 12 | Precipitates Turbidity | 5.5 |
| 32 | J | 1.0 | 45 | None | Maleic anhydride 4.2 | None | Hexane | 9 | Precipitates Turbidity | 8.7 |

*1 [Solution viscosity at 25° C. of an adhesive composition after being allowed to stand for 30 days]/[Initial solution viscosity at 25° C. of an adhesive composition]

TABLE 11

| | The modified copolymer rubber | | | | | | | |
|---|---|---|---|---|---|---|---|---|
| Adhesive composition | Intrinsic viscosity*1 (100 ml/g) | Amount of propylene (% by weight) | Non-conjugated diene and its iodine number | Acid anhydride and/or dicarboxylic acid and the amount thereof (% by weight) | Amount of styrene (% by weight) | Amount of of diethylamine (mole per mole of acid anhydride) | Additive and amount (phr) | Organic solvent | Solids concentration (% by weight) |
| K | 1.4 | 22 | None | Maleic anhydride 1.3 | None | None | None | Toluene | 10 |
| L | 1.5 | 25 | Ethylidenenorbornene Iodine Number 5 | Maleic anhydride 1.0 Maleic acid 0.3 | None | None | FEF black 20 | Xylene | 9 |
| M | 1.6 | 27 | None | Maleic anhydride 4.7 | 3.6 | None | None | Toluene | 9.5 |
| N | 1.2 | 22 | None | Maleic anhydride 1.6 | None | 1.0 | None | Toluene | 11 |
| O | 1.4 | 22 | None | None | None | None | None | Toluene | 10 |

Note: *1 The intrinsic viscosity was measured at 80° C. in toluene.

TABLE 12

| | Final adhesive composition | | | | |
|---|---|---|---|---|---|
| | Adhesive composition | Diamine compound and the amount thereof (mole per mole of the total amount of acid anhydride and dicarboxylic acid) | Adherends | Curing conditions | Adhesive strength (kgf/20 mm) |
| Example | | | | | |
| 33 | K | Hexamethylenediamine 0.5 | Vulcanized EPDM composition A-vulcanized EPDM composition A | Allowed to stand at room temperature for 7 days | 5.3 |
| 34 | L | Hexamethylenediamine carbamate 1 | Vulcanized EPDM composition B-vulcanized EPDM composition B | Heated at 80° C. for 40 min and thereafter allowed to stand at room temperature for 7 days | 6.1 |
| 35 | M | Hexamethylenediamine carbamate 0.3 | Vulcanized EPDM compositon B-vulcanized EPDM composition B | Allowed to stand at room temperature for 7 days | 4.6 |
| 36 | N | Hexamethylenediamine carbamate 0.5 | Vulcanized IIR composition-vulcanized IIR composition | Heated at 80° C. for 40 min and thereafter allowed to stand at room temperature for 7 days | 4.1 |
| 37 | M | Hexamethylenediamine carbamate 0.5 | Vulcanized EPDM composition B-nylon plain cloth of 100 denier | Heated at 150° C. for 40 min and thereafter allowed to stand at room temperature for 7 days | 2.3 |
| 38 | M | Hexamethylenediamine 0.5 | Vulcanized EPDM composition B-polyester plain cloth of 200 denier | Heated at 150° C. for 40 min and thereafter allowed to stand at room temperature for 7 days | 3.0 |
| 39 | K | None | Vulcanized EPDM composition A-vulcanized EPDM composition A | Allowed to stand at room temperature for 7 days | 4.4 |
| 40 | M | None | Vulcanized EPDM composition B-nylon plain cloth of 100 denier | Heated at 150° C. for 40 min and thereafter allowed to stand at room temperature for 7 days | 2.0 |
| Comparative Example | | | | | |
| 19 | O | Hexamethylenediamine carbamate 0.5 | Vulcanized EPDM composition A- | Allowed to stand at room temperature for 7 days | 1.1 |

TABLE 12-continued

| | Final adhesive composition | | | |
|---|---|---|---|---|
| Adhesive composition | Diamine compound and the amount thereof (mole per mole of the total amount of acid anhydride and dicarboxylic acid) | Adherends | Curing conditions | Adhesive strength (kgf/20 mm) |
| | | vulcanized EPDM composition A | | |

TABLE 13

| | | Final adhesive composition | | |
|---|---|---|---|---|
| Example | Adhesive composition | Diamine compound and the amount thereof (mole per mole of acid anhydride) | Adherends | Adhesive strength (kgf/20 mm) |
| 41 | K | Hexamethylenediamine 0.5 | Unvulcanized EPDM composition A-Unvulcanized EPDM composition A | 7.5 |
| 42 | N | Hexamethylenediamine carbamate 0.5 | Unvulcanized EPDM composition B-Unvulcanized EPDM composition B | 6.8 |
| 43 | N | Hexamethylenediamine carbamate 0.5 | Unvulcanized EPDM composition B-polyester plain cloth of 200 denier | 4.2 |
| 44 | K | None | Unvulcanized EPDM composition A-Unvulcanized EPDM composition A | 5.3 |

TABLE 14

| | Final adhesive composition | | | | |
|---|---|---|---|---|---|
| | Adhesive composition | Diamine compound and the amount thereof (mole per mole of the total amount of acid anhydride and dicarboxylic acid) | Adherends | Curing conditions | Adhesive strength (kgf/20 mm) |
| Example | | | | | |
| 45 | K | Hexamethylenediamine carbamate 0.5 | Nylon plain cloth of 100 denier - nylon plain cloth of 100 denier | Heated at 120° C. for 40 min and thereafter allowed to stand at room temperature for 7 days | 1.7 |
| 46 | N | Hexamethylenediamine carbamate 0.5 | Nylon plain cloth of 100 denier - nylon plain cloth of 100 denier | Heated at 120° C. for 40 min and thereafter allowed to stand at room temperature for 7 days | 1.9 |
| 47 | N | Hexamethylenediamine 1 | Polyester plain cloth of 200 denier-polyester plain cloth of 200 denier | Heated at 150° C. for 40 min and thereafter allowed to stand at room temperature for 7 days | 2.5 |
| 48 | K | None | Nylon plain cloth of 100 denier-nylon plain cloth of 100 denier | Heated at 120° C. for 40 min and thereafter allowed to stand at room temperature for 7 days | 1.3 |
| Comparative Example | | | | | |
| 20 | O | Hexamethylenediamine carbamate 0.5 | Nylon plain cloth of 100 denier-nylon plain cloth of 100 denier | Heated at 120° C. for 40 min and thereafter allowed to stand at room temperature for 7 days | 0.5 |

What is claimed is:

1. A method of adhering an ethylene/α-olefin copolymer rubber or an ethylene/α-olefin-diene terpolymer rubber to one member selected form the group consisting of an ethylene/α-olefin copolymer rubber, and ethylene/α-olefin/diene terpolymer rubber, nylon fibers, polyester fibers, nylon plain cloth and polyester plan cloth,
which method comprises using, as an adhesive, a composition comprising a modified, ethylene/α-olefin copolymer rubber or a modified, ethylene/α-olefin/non-conjugated diene copolymer rubber, either rubber containing 0.1–10% by weight of an olefinically unsaturated acid anhydride and 0.81–1 moles of a dialkylamine per mole of the acid anhydride, and an organic solvent wherein said dialkylamine is selected from the group consisting of diethylamine and dibutylamine.

2. A method according to claim 1, wherein the α-olefin has 3–10 carbon atoms.

3. A method according to claim 1, wherein the α-olefin is propylene.

4. A method according to any one of claims 1, 2 and 3, wherein the non-conjugated diene is selected from the group consisting of dicyclopentadiene, ethylidenenorbornene and 1,4-hexadiene.

5. A method according to claim 4, wherein the olefinically unsaturated acid anhydride is selected from the group consisting of maleic anhydride, citraconic anhydride and nadic anhydride.

6. A method according to claim 4, wherein the olefinically unsaturated acid anhydride is maleic anhydride.

7. A method according to claim 4, wherein the dialkylamine is diethylamine.

8. A method according to claim 4, wherein the dialkylamine is dibutylamine.

9. A method according to claim 4, wherein the organic solvent is selected from the group consisting of toluene, xylene, hexane, cyclohexane, pentane, benzene, ethylbenzene, ethyltoluene, cumene, diethylbenzene, chloroform and tetrachloromethane.

10. A method according to any one of claims 1, 2 and 3, wherein the non-conjugated diene is ethylidenenorbornene.

11. A method according to claim 10, wherein the olefinically unsaturated acid anhydride is selected from the group consisting of maleic anhydride, citraconic anhydride and nadic anhydride.

12. A method according to claim 10, wherein the olefinically unsaturated acid anhydride is maleic anhydride.

13. A method according to claim 10, wherein the dialkylamine is dibutylamine.

14. A method according to claim 10, wherein the dialkylamine is diethylamine.

15. A method according to claim 10, wherein the organic solvent is selected from the group consisting of toluene, xylene, hexane, cyclohexane, pentane, benzene, ethylbenzene, ethyltoluene, cumene, diethylbenzene, chloroform and tetrachloromethane.

16. A method according to any one of claims 1, 2 and 3, wherein the olefinically unsaturated acid anhydride is selected from the group consisting of maleic anhydride, citraconic anhydride and nadic anhydride.

17. A method according to claim 16, wherein the dialkylamine is diethylamine.

18. A method according to claim 16, wherein the dialkylamine is dibutylamine.

19. A method according to claim 16, wherein the organic solvent is selected from the group consisting of toluene, xylene, hexane, cyclohexane, pentane, benzene, ethylbenzene, ethyltoluene, cumene, diethylbenzene, chloroform and tetrachloromethane.

20. A method according to any one of claims 1, 2 and 3, wherein the olefinically unsaturated acid anhydride is maleic anhydride.

21. A method according to claim 20, wherein the dialkylamine is dibutylamine.

22. A method according to claim 20, wherein the dialkylamine is diethylamine.

23. A method according to claim 20, wherein the organic solvent is selected from the group consisting of toluene, xylene, hexane, cyclohexane, pentane, benzene, ethylbenzene, ethyltoluene, cumene, diethylbenzene, chloroform and tetrachloromethane.

24. A method according to any one of claim 1, 2 and 3, wherein the dialkylamine is dibutylamine.

25. A method according to claim 24, wherein the organic solvent is selected from the group consisting of toluene, xylene, hexane, cyclohexane, pentane, benzene, ethylbenzene, ethyltoluene, cumene, diethylbenzene, chloroform and tetrachloromethane.

26. A method according to any one of claims 1, 2 and 3, wherein the organic solvent is selected from the group consisting of toluene, xylene, hexane, cyclohexane, pentane, benzene, ethylbenzene, ethyltoluene, cumene, diethylbenzene, chloroform and tetrachloromethane.

* * * * *